United States Patent
Shull et al.

(10) Patent No.: US 6,652,039 B1
(45) Date of Patent: Nov. 25, 2003

(54) ANTI-LOCK BRAKING SYSTEM WITH ACCUMULATOR VOLUME MONITORING

(75) Inventors: Brian D. Shull, Charleston, SC (US); James L. Lundy, Jr., Charleston, SC (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/261,047

(22) Filed: Sep. 30, 2002

(51) Int. Cl.[7] .................................................. B60T 8/34
(52) U.S. Cl. ................................. 303/113.2; 303/113.5; 303/DIG. 11
(58) Field of Search ............ 303/DIG. 11, 113.1–113.5, 303/116.1, 116.2, 139

(56) References Cited

U.S. PATENT DOCUMENTS 5,477,675 A * 12/1995 Ingraham et al. .............. 60/418
6,419,329 B1 * 7/2002 Buschmann et al. ..... 303/113.1
6,543,859 B2 * 4/2003 Sakamoto ................ 303/113.2

* cited by examiner

*Primary Examiner*—Christopher P. Schwartz
(74) *Attorney, Agent, or Firm*—Leo H McCormick, Jr.; Warren Comstock

(57) ABSTRACT

A method for measuring the volume of hydraulic fluid in the secondary circuit of a braking system, especially in an accumulator, through the use of a Hall-effect magneto resistive device. A secondary hydraulic circuit includes an accumulator (11, 137), an electric motor (71, 101) driven hydraulic pump (73, 143), and appropriate valving (133) for supplying braking force hydraulic pressure from a master cylinder to one or more wheel cylinders. There is a secondary hydraulic circuit supply path for each wheel brake cylinder and each path includes a first normally open solenoid actuable valve (41, 43, 57, 59, 97, 149) providing a brake fluid path from the master cylinder to the wheel brake cylinder and a first normally closed solenoid actuable valve (61, 65, 67, 69, 139, 141) selectively opening during an anti-lock event to provide a path to bleed fluid from the associated wheel cylinder to the accumulator (11, 137). One or more accumulator volume sensors (37, 39, 145, 147) provide an indication of the volume of brake fluid in the accumulators and an electronic control unit (127) responds to sensed accumulator volume for selectively opening a first normally closed valve during normal vehicle braking to maintain a preferred volume of brake fluid in the accumulator (11, 137) such that either an optimum anti-lock event or a traction control event may immediately occur.

14 Claims, 4 Drawing Sheets

ANTI-LOCK BRAKING SYSTEM WITH ACCUMULATOR VOLUME MONITORING

The present invention relates to improvements to the performance and operation of anti-lock braking systems by employing non-contact position monitoring of an accumulator piston to control the volume of fluid retained within the secondary circuit of the braking system hydraulic unit.

BACKGROUND OF THE INVENTION

Many known anti-lock devices operate by cyclically increasing and decreasing the braking force exerted on the wheels so that a wheel having a tendency to lock is permitted to re-accelerate back toward a speed corresponding to the speed of the vehicle. This is typically achieved by control valves alternately allowing fluid to flow out of and then into the brake cylinder to first lower and then raise the brake pressure in the brake system. Some anti-lock systems employ a pump-back scheme where fluid is dumped from the wheel cylinder to a local accumulator and the same hydraulic fluid is re-supplied from the local accumulator to the brake pad actuators. Simple ABS designs do not have the ability to generate wheel pressures in excess of master cylinder pressure, thus making them incapable of performing any active pressure events.

Most of such anti-lock braking systems are further capable of operating in a traction control mode. Traction control and anti-lock operation are both responses to aberrant vehicle wheel behavior. A traction control function is established by detecting conditions where the rotational speed of a first powered wheel substantially exceeds that of a second powered wheel. To provide a power balance in the operation of the vehicle, a braking force is applied to the powered wheel rotating at a higher speed to effectively transfer driving torque back to the other wheel that has better traction. Many anti-lock systems having such a traction control feature employ a motor and hydraulic pump or pumps which operate independent of the service braking system to supply fluid from a local accumulator to brake the wheel which has lost traction. The same local accumulator may be utilized during anti-lock operation and during a traction control event. In this case, it is highly desirable that the accumulator be sufficiently empty to receive braking fluid it is highly desirable that the accumulator be sufficiently empty to receive braking fluid dumped from a wheel cylinder during the anti-lock event and be sufficiently full to supply the needed fluid to the pump during a traction control event.

U.S. Pat. No. 5,971,502 is illustrative of such anti-lock braking systems with traction control (sometimes "dynamic rear proportioning") capability. This patent also discloses a process for maintaining an optimum level of pressurized hydraulic fluid in a hydraulic accumulator. This optimum level allows the accumulator to immediately respond to a sensed aberrant wheel condition to receive fluid during an anti-lock braking event and to dispense fluid at the beginning of either a traction control event or back-up braking situations. The process includes a step of monitoring a plurality of vehicle operating parameters such as speed and recent braking activity (hydraulic fluid pressure) and utilizing those monitored parameters to periodically determining the likelihood of the occurrence of an anti-lock braking event. The amount of fluid in the accumulator is increased when the likelihood of an anti-lock braking event is low and is decreased when the likelihood of an anti-lock braking event is high. The likelihood of a traction control event may also be monitored and the amount of fluid in the accumulator increased when the likelihood of an anti-lock braking event is low and the likelihood of a traction control event is high.

The volume of fluid in an accumulator was also addressed by the patentee of U.S. Pat. No. 5,522,650, who, in an attempt to minimize motor "on-time" and reduce vehicle noise and vibration, devised an algorithm for modeling the amount of fluid in the accumulator and enabled a motor to remove fluid from that local accumulator only as necessary. This patent is typical of all current designs in that software must make an estimation of the accumulator volume. This leads to increased motor running times, and reduced accuracy of pressure control algorithms.

Current designs require that the secondary circuit volumes be minimized in order to accurately estimate the suction path and maximize the through flow of this line in an ESP or TCS (traction control) event. Sophisticated algorithms are used to minimize the noise while maximizing the performance. Several ways currently exist to improve the performance of the ESP system, most including the addition of some volume in the suction path near the pump element inlet. Software algorithm development and implementation is limited to the information available through the electronic control unit (ECU) and its sensor array. Without an accurate measurement of the brake circuit volume, an estimation of this volume is utilized. If the secondary circuit volume could be measured, many improvements to the control algorithm could be implemented. The presence of an optimum amount of fluid in a secondary brake circuit residual reservoir can significantly improve pressure build times during traction control events.

There are many methods available for position monitoring. For example, International Application No. PCT/EP 01/12269 published as WO 02/36400 Ai teaches a Hall sensing element integrated into the master cylinder of a hydraulic brake system to sense the field of a magnetic region associated with the master cylinder piston for relatively rapid determinations of brake pedal position. Many other position sensing methods, such as linear variable differential transformers (LVDT's) or various other mechanically actuated measuring techniques are also known, however they typically involve significant modifications to the existing hydraulic unit design box volume. Additionally, they are cost prohibitive, and do not provide a simple way to measure volume in the sealed designs already in production.

SUMMARY OF THE INVENTION

The present invention employs accumulator chamber management that is a unique and superior method to these designs. It provides a magnetic field sensor such as a Hall-effect solid-state sensing device or magneto resistive sensor to monitor the accumulator piston position to determine the amount of brake fluid contained in the accumulator chambers of an ABS hydraulic unit.

The accumulator chamber is a component of what is collectively referred to herein as the secondary braking circuit. The secondary circuit is that portion of the anti-lock braking modulator system that is employed during an anti-lock or traction event to make possible the necessary modulation of brake fluid pressure. During normal braking events such as moderate deceleration on a good road surface, the secondary circuit remains isolated from the primary hydraulic braking circuit that is used to transfer pressure from the master cylinder to the wheel cylinder.

The invention comprises, in one form thereof, a process of controlling the secondary hydraulic circuit of a vehicle braking system during aberrant wheel behavior, e.g., one wheel slipping excessively as in a traction control event or one wheel tending to lock during braking as in an anti-lock braking event. The process includes creating a magnetic field adjacent an accumulator in the secondary braking circuit and modifying the magnetic field in accordance with changes in the fluid volume within the accumulator. Changes in the magnetic field are monitored and those changes translated into an indication of accumulator fluid volume. The indication is then utilized in controlling operation of the secondary circuit, for example, by increasing the volume of fluid in the accumulator during anti-lock operation or supplying fluid to the pump from the accumulator to brake a slipping wheel as in a traction control event.

In another form, a process of braking a slipping one of a pair of differentially driven wheels to transfer driving torque therefrom to the other of the differentially driven pair of wheels includes maintaining a preferred volume of brake fluid in an accumulator, monitoring the rotational speed of each of the driven wheels, identifying one wheel speed as deviant if the monitored speed thereof becomes too much larger than that of the other driven wheel, and closing a normally open valve which provides a path for the application of normal braking fluid pressure to a brake actuating mechanism associated with the non-deviant wheel to isolate the non-deviant wheel from fluid braking pressure. A pump is then energized to supply brake fluid from the accumulator to a brake actuating mechanism associated with the deviant wheel to slow the deviant wheel, which allows the transfer of driving torque to the non-deviant wheel. Monitoring of the deviant wheel speed continues and the pump is periodically energized and de-energized to reduce the supply of brake fluid to the brake actuating mechanism associated with the deviant wheel. The pump is disabled and the previously closed valve is allowed to open upon an indication that the deviant wheel has achieved a target speed. To accommodate extreme cases, the volume of fluid remaining in the accumulator continues to be monitored and a further valve is opened to supply brake fluid from a master cylinder to the pump inlet when the monitored accumulator volume reaches a minimum value.

An advantage of the present invention is that the ability to calculate accumulator volume facilitates both the software development and production control algorithms by providing an accurate accounting of the amount of brake fluid in the secondary circuit of the braking system.

Accumulator chamber management allows for the use of proven components that are significantly less expensive than the current ESP designs. Thus, another advantage of the present invention is that modifications to the hardware of existing hydraulic braking systems to incorporate the present invention are minimal.

A further advantage is through the use of secondary circuit brake fluid management with pulse width modulation motor drive and accumulator position monitoring, significant performance enhancements can be achieved using less complex hydraulic components.

An advantage of one form of the present invention is based on the use of controlled accumulator piston stroke to manage the secondary circuit volume for ABS (anti-lock) hydraulic units thus allowing for PBC (panic braking) and partially active ESP (electronic stability programs) to be performed without the need of isolation and suction valves.

As another advantage, the volume of brake fluid in the accumulator provides the additional benefit of acting as a spring loaded pre-charge for the pump element, optimizing the pump performance throughout the temperature envelope and eliminating the need for a supplemental pressurized brake fluid accumulator. This allows the use of an inexpensive pump for all designs.

A further advantage of the present invention is that the cost of providing direct accumulator volume information is quite modest.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
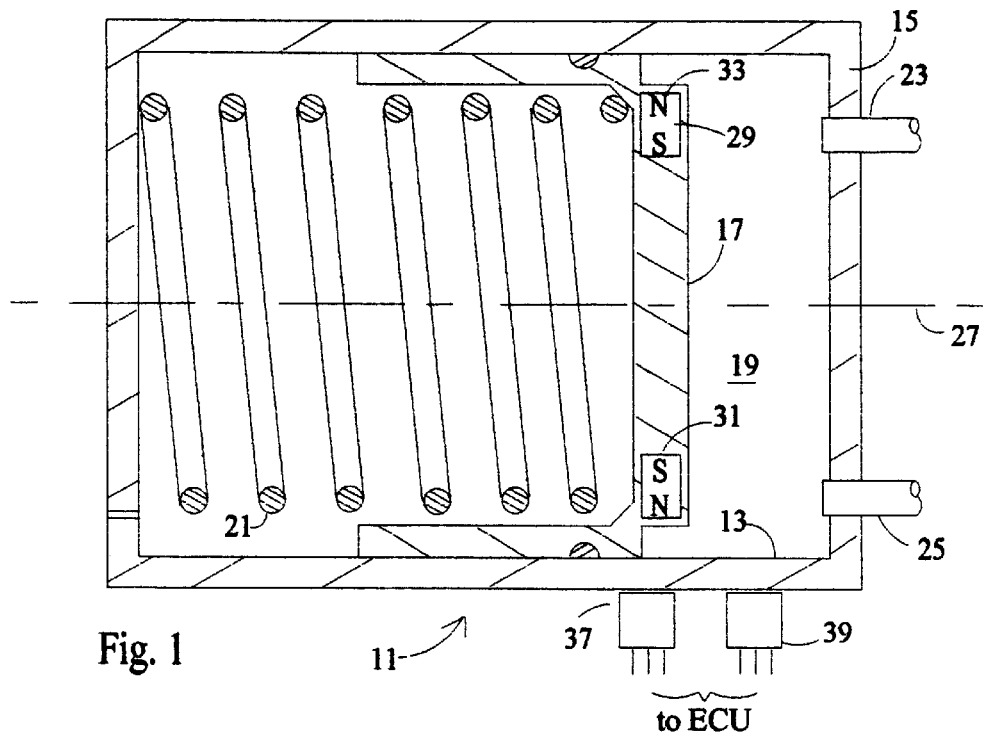
FIG. 1 is a cross-sectional view of an illustrative accumulator having non-invasive volume monitoring according to one form of the invention.

Referring now to the drawings and particularly to FIG. 1, there is shown a cross-section view of an accumulator 11 having a cylindrical bore 13 within a housing 15. A piston 17 is reciprocally contained therein and defines in conjunction therewith a chamber 19. Chamber 19 has a variable volume that is a function of the position of the piston 17 along axis 27. The piston 17 is resiliently urged in a direction (rightward as viewed) to diminish the chamber 19 volume by a bias spring 21. Hydraulic fluid may enter or exit the chamber 19 by way of two conduits 23 and 25. Imbedded in the piston 17 face, or otherwise affixed to and moving with the piston, is a radially magnetized annular magnet 29 having a radially inner south pole 31 and a radially outer north pole 33. A series of magnetic sensors 37 and 39 such as Hall effect sensors or magneto resistive sensors are located closely adjacent the housing exterior to be influenced by the field of magnet 29. Thus, the condition or status of the sensors 37 and 39 reflects the piston 17 position along axis 27 and, therefore, the volume of chamber 19. The outputs of the Hall sensor or other sensors are coupled to an electronic control unit (ECU) shown in FIG. 5 and the ECU supplies control signals to the braking system. The sensors may provide either analog or digital outputs. In one preferred embodiment, the sensors 37 and 39 employed were Honeywell 2SS52M omnipolar magneto resistive sensors providing a digital output. Of course, the housing 15 and piston 17 should be of a relatively low permeability material such as aluminum or a plastic so as to not shunt the magnetic field away from the sensors. The magnetic material is affixed to the piston 17 of accumulator 11 in the secondary circuit of the hydraulic unit as shown in greater detail in FIGS. 2 and 3. A commercially available Hall effect or other suitable sensor 37 or 39 is positioned in a fixed location near the accumulator bore 13 and is used to detect the field generated by the magnetic material. As the accumulator is filled with brake fluid, the piston 17 moves and as a result the magnetic field density changes with respect to the sensor. Using two or more of these sensors provides a method for determining with varying accuracy, the position of the accumulator piston at any time. The sensor array's detection of piston movement is calibrated with software to calculate specific brake fluid volume.

Figure 2:
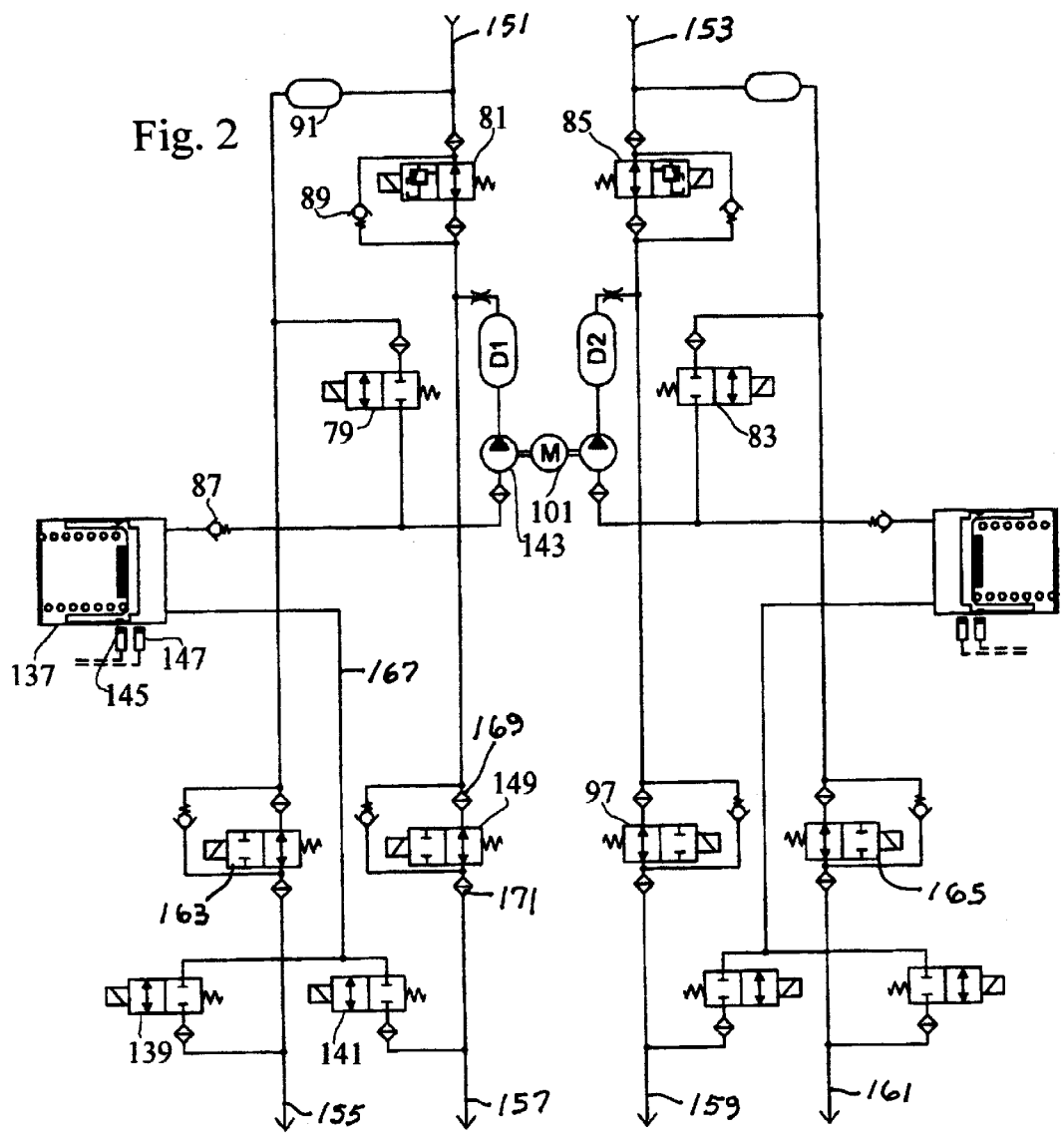
FIG. 2 is a schematic illustration of a portion of an anti-lock braking hydraulic circuit incorporating the invention in one form.

In FIG. 2, a full function anti-lock and traction control hydraulic braking system is shown schematically. There are two substantially identical fluid circuits each having an accumulator such as 137, a pump such as 143, two normally closed outlet valves, 139 and 141 for example, for venting fluid from the wheel cylinders during anti-lock or traction control events and two normally open inlet valves such as 149 providing a brake fluid path to their corresponding wheel cylinders. The circuits may share a pump drive motor 101.

More specifically, FIG. 2 shows normally open solenoid actuated inlet valves 149 and 97 located between an operator-controlled pressure source such as a master cylinder for supplying pressurized fluid to lines 151 and 153 and hydraulic brake actuators which receive that pressurized fluid by way of lines 155, 157, 159 and 161. Lines 157 and 159 lead to brake actuators or cylinders associated with the power receiving or driven wheels, the front wheels for example, while lines 155 and 161 are coupled to the non-driven wheels, or rear wheel brake cylinders in this example. Two separate hydraulic circuits are shown, with two wheels on each circuit. The vehicle wheels also have rotational wheel speed sensors or WSS 125 (FIG. 5) for providing electrical indications of the angular velocities of individual wheels to an electronic control unit or ECU 127. When the driver wishes to slow the vehicle, a pedal is depressed to develop an input force that is transformed by the vehicle's master cylinder (or other type of booster mechanism) to hydraulic fluid pressure. This hydraulic pressure is transmitted from the master cylinder by way of conduits (brake lines) 151 and 153 to the respective rear and front pairs of brake actuators by way of four individual solenoid actuated inlet valves 163, 149, 97 and 165. All four of the individual inlet valves are normally open and provide the path for braking fluid pressure during normal braking. However, if during a braking event a wheel skid is detected, say the wheel associated with line 155, the solenoid of valve 163 is energized closing that valve and the outlet valve 139 is enabled to vent fluid pressure from the slipping wheel cylinder by way of line 167 to the accumulator 137. Inlet valves 149, 97 and 165 function similarly. The inlet and outlet valves associated with the slipping wheel may be pulsed or otherwise controlled as is common in anti-lock braking technology. The accumulator 137 is sized such that worst-case venting conditions during an anti-lock event do result in wheel lock. If loss of traction of a driven wheel the wheel associated with line 157 for example, is detected, valves 163, 97, 81, and 165 are closed, motor 101 is energized driving pump 143 to supply braking fluid pressure by way of pressure damper 169, flow restrictor 171 and the normally open valve 149 to restrict wheel rotation and transfer driving torque to the other wheel. Venting of fluid from the wheel cylinder is, as before, by way of valve 141 to the accumulator 137. Valve 149 remains open and does not otherwise participate in a traction control event.

In operation, only one circuit will be described in further detail. The accumulator 137 is partially filled by switching the inlet valves 163 and 149, and the outlet valves 139 and 141 briefly during standard braking. The brake fluid is retained in the accumulator by the pump element 143, the suction valve 79, and the outlet valves 139 and 141. The amount of brake fluid held in the accumulator is determined by the position monitoring sensor array 37, 39. The accumulator is designed such that there is sufficient reserve capacity to accommodate worst case surface transitions during ABS (anti-lock) events, but enough brake fluid is retained in the accumulator to pre-charge the pump 143 during the rapid pressure increases needed for PBC (Panic Brake Control) and ESP events. ESP or electronic stability programs typically function to smooth or appropriately modulate braking. When traction control is required, two hydraulic valves are actuated to close. The first valve such as 97 prevents braking of the non-deviant wheel while the second valve such as 81, commonly known as an isolation valve, closes to permit the build up of hydraulic pressure by the pumps in the braking circuits. Initially, the threshold of check valve 87 is exceeded and additional fluid withdrawn from the accumulator 137 to apply a braking force to the deviant wheel.

The use of controlled accumulator piston stroke to manage the secondary circuit volume for ESP hydraulic units eliminates the need for a two-stage valve capable of switching against master cylinder pressure in the suction path during PBC and active pressure ESP events. Thus, the valve can be replaced with a simple single: stage valve such as 79 which opens after the accumulator empties during a traction control event in order to continue supplying brake fluid to the pump.

Figure 4:
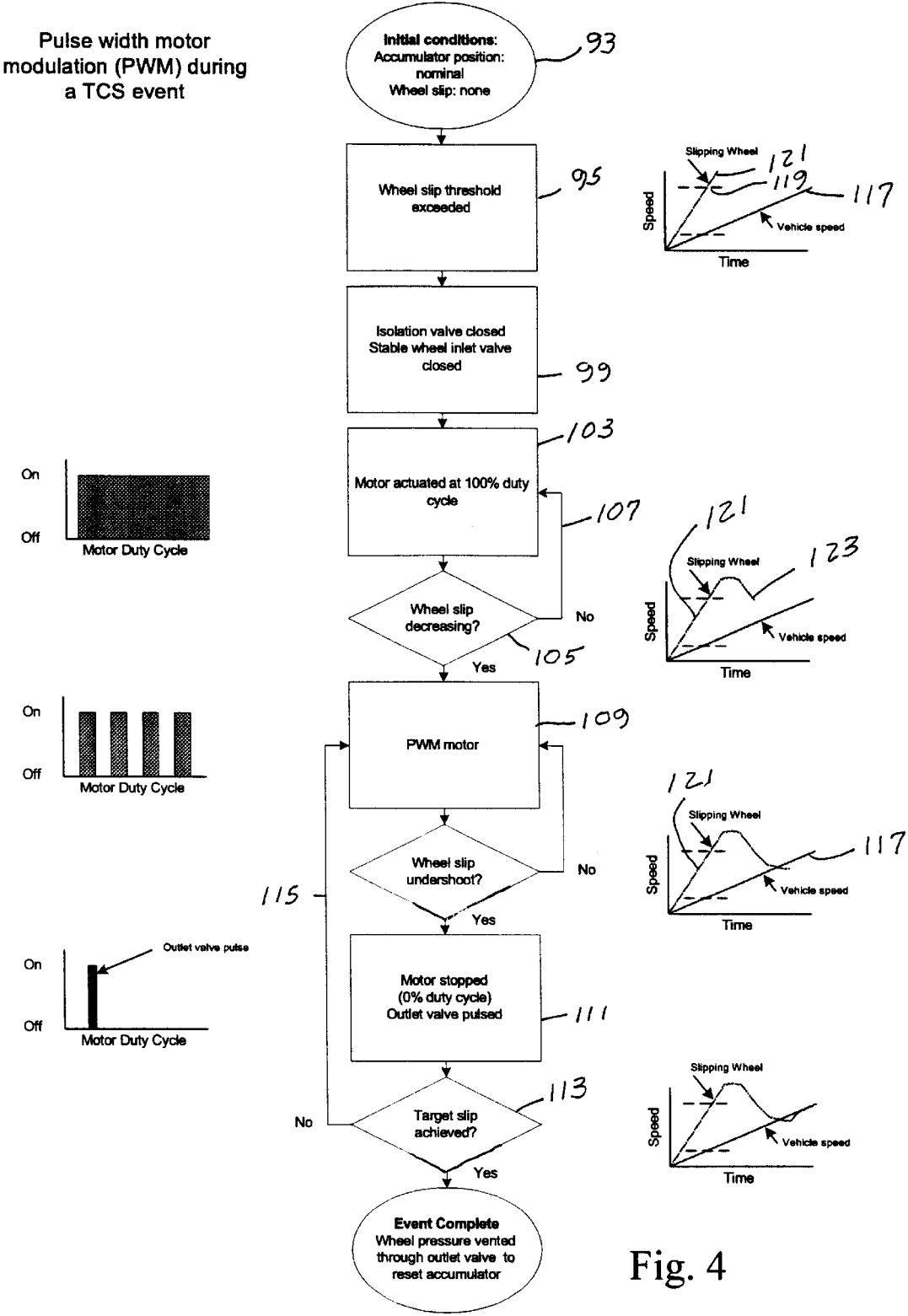
FIG. 4 is a flow chart showing a pulse width modulation algorithm for the electric motor to properly control the secondary hydraulic circuit volumes and resultant wheel pressures that occur during modulation.

A PWM algorithm for the electric motor is also necessary to properly control the secondary circuit volumes and resultant wheel pressures that will occur during modulation and is shown in FIG. 4. Comparing FIGS. 2 and 4, normal operation during modulation and is shown in FIG. 4. Comparing FIGS. 2 and 4, normal operation with no wheel slip is indicated at 93. Rectangle 95 indicates wheel speed sensors 125 are providing an indication of vehicle speed as it increases along line 117 of the adjacent graph. One wheel begins to slip (accelerate) and the speed of the slipping wheel (line 121) moves toward and perhaps beyond the threshold speed shown by dotted line 119. The threshold speed 119 is not constant, but varies directly with vehicle speed. If the wheel slip threshold (excessive speed) is exceeded as shown at 95, isolation valve 81 is activated to close and the stable driven wheel inlet valve 97 closes as indicated at 99. Motor 101 is turned full on at a 100% duty cycle as at 103. The slip of the deviant wheel continues to be monitored at 105 and the motor duty cycle is maintained at 100% so long as wheel slip does not diminish as shown by feedback line 107. When the wheel speed decreases sufficiently (as shown by the change to a negative slope of line 121 at 123), the duty cycle of motor energization is reduced as indicated at 109, for example, to about 50% and the motor receives power about one-half the time. Wheel slip continues to be monitored and, so long as a target slip has not yet been reached (undershoot), motor 101 continues at the illustrative 50% duty cycle. When the target slip is passed as shown by line 121 intersecting line 117 in the adjacent graph, the duty cycle of motor energization is reduced to zero as shown at 111 and outlet valve 141 is pulsed to slightly relieve braking fluid pressure. Slip is being monitored for achievement of a target slip as at 113 and so long as the target slip is not reached, motor energization followed by pulsing valve 141 is repeated as shown by line 115. When that target is attained, valve 141 is opened relieving all braking force.

Figure 3:
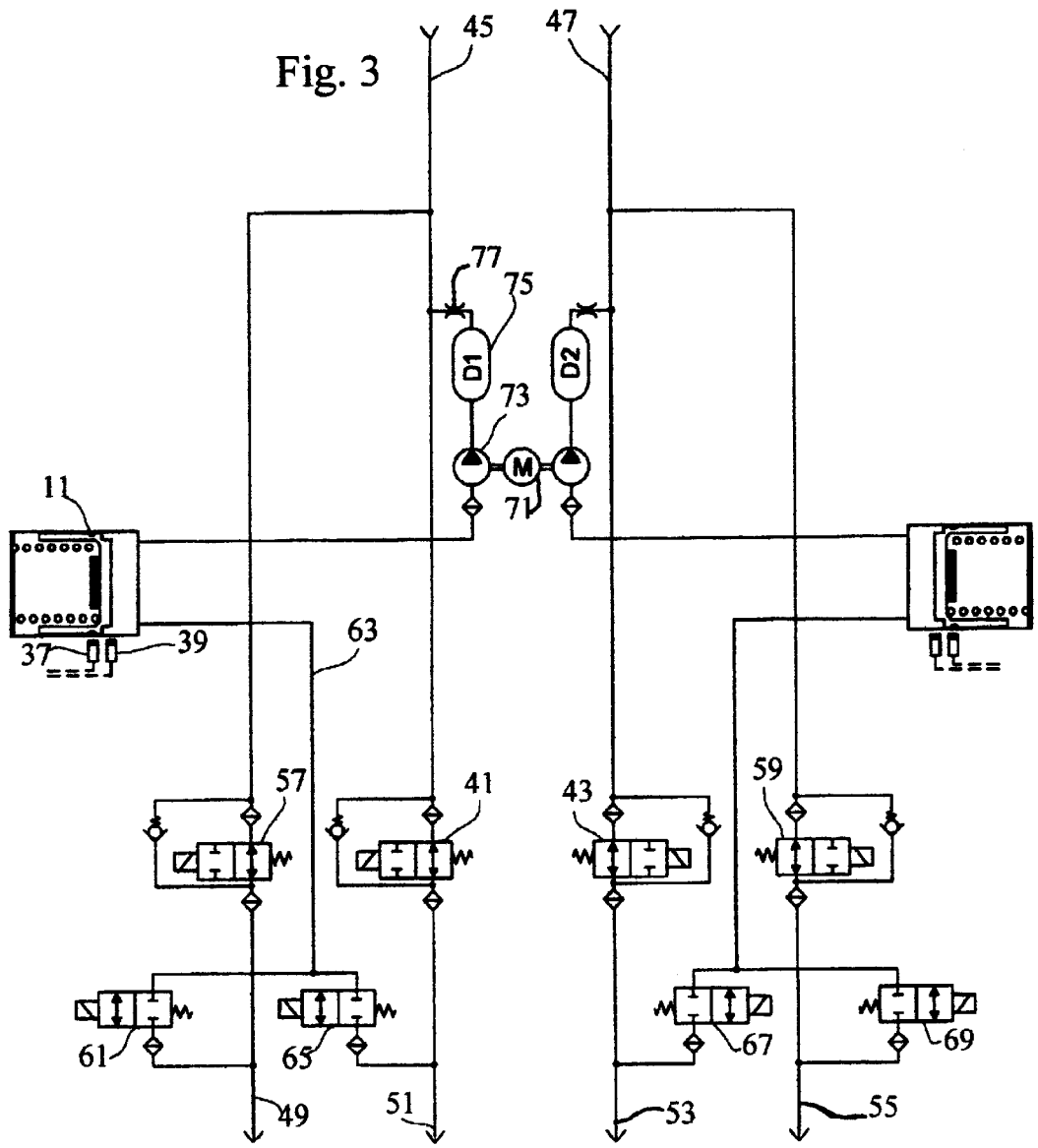
FIG. 3 is a schematic illustration of a portion of an anti-lock braking hydraulic circuit incorporating the invention in a modified form.

FIG. 3 illustrates two substantially identical hydraulic circuits each having an accumulator, a pump and various valves. The circuits may share a common pump drive motor 71. The hydraulic circuit of FIG. 3 differs from that of FIG. 2 by the absence of a pair of normally closed suction valves 79 and 83 with their associated in-line filters such as 151, a pair of isolation valves 81 and 85, two check valves such as 87, and a pair of integrated suction dampers (ISD's) such as 91 which are bladder-like structures that improve pump performance. The accumulators, 11, for example, are partially filled by switching the inlet valves such as 41 and 57, and the outlet valves such as 61 or 65 briefly during standard braking. The brake fluid is retained in the accumulator by the closing forces of the pump element 73 and the outlet valves. The amount of brake fluid held in the accumulators is determined by the position monitoring sensor array 37, 39 and controlled by the ECU. The accumulator is designed such that there is sufficient reserve volume to accommodate worst-case surface transitions during ABS events, but enough brake fluid is retained in the accumulator to supply the pump during limited PBC (Panic Brake Control) and active pressure ESP events. Note, the common isolation valves normally found in anti-lock systems (and in FIG. 2) are missing from FIG. 3. The system of FIG. 3 uses master cylinder pressure in place of the isolation valve to hold the pressure in the circuit. Small to moderate pressure increases above the master cylinder pressure are possible for short periods such as are seen during braking transitions and lane change events. Thus, FIG. 3 illustrates an enhanced anti-lock braking system (ABS) with limited electronic stability program (ESP) and panic brake control (PBC) which is realized through the use of the ESP sensor array, pulse width modulated (PWM) motor management, and Non-Contact Accumulator Position monitoring devices. Master cylinder pressure is used in place of the isolation valve for pressure active events such as lane changes and panic braking situations. Fully active ESP and TCS (traction control) are not possible with this concept because there is no way to hold the pressure in the wheels in the absence of any master cylinder pressure.

Figure 5:
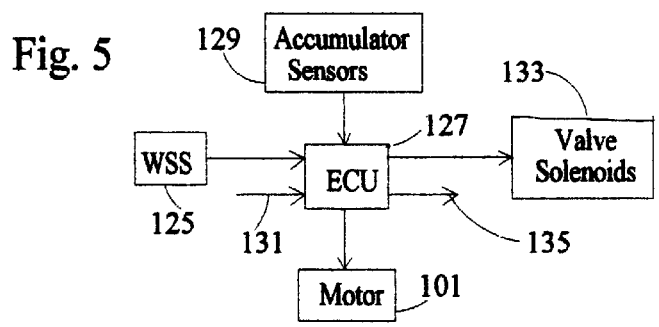
FIG. 5 is a general block diagram of the anti-lock system architecture.

FIG. 5 illustrates the overall architecture of a vehicle braking system incorporating the present invention. An electronic control (ECU) 127 receives input information on accumulator volume from sensors 129 and information on vehicle speed from the wheel speed sensors (WSS) 125 as well as other vehicle performance and/or additional inputs such as ESP sensor information as indicated generally at 131. The ECU 127 issues commands to initiate any of several actions to the pump motor 101 and various solenoid valves 133. Further information or actions may also be issued or initiated as indicated generally by 135.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. In a vehicle braking system having a master cylinder for selectively supplying a first hydraulic braking pressure through a primary hydraulic brake circuit to a plurality of wheel brake cylinders; an electronic control unit for monitoring vehicle operation; and a secondary hydraulic circuit connected to said primary hydraulic brake circuit and including a pump for selectively supplying a second hydraulic braking pressure to wheel brake cylinders, said secondary hydraulic circuit having an accumulator for receiving said first hydraulic fluid from said wheel brakes and dispensing said second hydraulic fluid to wheel brake cylinders and a plurality of valves under control of the electronic control unit to selectively transfer hydraulic fluid to and from the accumulator, a process of controlling the secondary hydraulic circuit of the vehicle braking system during aberrant wheel behavior comprising the steps of:

creating a magnetic field adjacent the accumulator;

modifying the magnetic field in accordance with changes in the fluid volume within the accumulator;

monitoring changes in the magnetic field;

translating the magnetic field changes into an indication of accumulator fluid volume; and utilizing the volume indication in controlling operation of the secondary circuit to change said volume of fluid in said accumulator during an aberrant wheel behavior such that a sufficient reserve volume of hydraulic fluid is retained in said accumulator to receive said first hydraulic fluid during an anti-lock braking event and to supply a pump with said second hydraulic fluid during a traction control event.

2. The process of claim 1, wherein said aberrant wheel behavior is a traction control event where one wheel of a differentially driven pair of wheels is rotating excessively faster than the other and the change of volume in said accumulator comprising energizing the pump to transfer fluid from the accumulator to the wheel brake cylinder associated with the faster wheel.

3. The process of claim 2, wherein if the pump substantially empties the accumulator, the electronic control unit causes a valve to open supplying additional fluid from the master cylinder to the pump inlet such that pressure is applied to the wheel brake cylinder associated with the slipping wheel.

4. The process of claim 1, wherein the aberrant wheel behavior is an an anti-lock braking event and the change of volume in said accumulator comprises opening a valve to selectively vent fluid from a wheel brake cylinder and increase the volume of fluid in the accumulator.

5. The process of claim 4, wherein the valve is repeatedly opened for short time intervals interspersed with the opening of another valve to supply additional fluid to the wheel brake cylinder.

6. The process of claim 1, including the additional step of selectively opening a valve to vent fluid from a wheel brake cylinder and increase the volume of fluid in the accumulator to a desired level during normal braking operation.

7. A process of braking a spinning one of a pair of differentially driven wheels to transfer driving torque therefrom to the other of the differentially driven pair of wheels, comprising the steps of:

maintaining a preferred volume of brake fluid in an accumulator;

monitoring the rotational speed of each of the driven wheels;

identifying one wheel speed as deviant if the monitored speed thereof becomes too much larger than that of the other driven wheel;

closing a normally open valve which provides a first path for the application of normal braking fluid pressure to a brake actuating mechanism associated with the non-deviant wheel;

energizing a pump to supply brake fluid from the accumulator through a second path to a brake actuating mechanism associated with the deviant wheel to slow the deviant wheel and transfer driving torque to the non-deviant wheel;

continuing to monitor the speed of the deviant wheel;

periodically energizing and de-energizing the pump to reduce the supply of brake fluid to the brake actuating mechanism associated with the deviant wheel; and disabling the pump and opening the previously closed valve upon an indication that the deviant wheel has achieved a target speed;

sensing a magnetic field which varies as a function of the accumulator brake fluid volume; and selectively opening a valve to vent fluid from a brake actuating mechanism and maintain the volume of fluid in the accumulator at a desired level during normal braking operation such that a sufficient reserve volume of hydraulic fluid is retained in said accumulator to receive hydraulic fluid during an anti-lock braking event and to supply said pump with hydraulic fluid during a traction control event.

8. The process of claim 7, including the further steps of monitoring the volume of fluid remaining in the accumulator, and opening a further valve to supply brake fluid from a master cylinder to the accumulator when the monitored value reaches a minimum value.

9. A vehicle braking system including:

an operator actuable master cylinder;

a plurality of wheel brake cylinders;

a primary hydraulic brake circuit supply for providing a first path for brake fluid from said master cylinder with said wheel brake cylinders;

a plurality of wheel speed sensors;

at least one electrically powered brake fluid pump;

at least one accumulator for receiving vented brake fluid from a wheel brake cylinder during an anti-lock event and supplying braking fluid by way of a corresponding pump to a wheel cylinder during a traction control event;

a secondary hydraulic circuit supply for providing a second path for brake fluid to each wheel brake cylinder, each second path being connected to a first normally open solenoid actuable valve in said first path through which brake fluid from the master cylinder is communicated to the wheel brake cylinders and a first normally closed solenoid actuable valve selectively opening during an anti-lock event providing a path to bleed fluid from the associated wheel cylinder to the accumulator;

an accumulator volume sensor providing an indication of the volume of brake fluid in the accumulator; and an electronic control unit responsive to sensed accumulator volume for selectively opening the first normally closed valve during normal vehicle braking to maintain a preferred volume of brake fluid in the accumulator such that a reserve volume of hydraulic fluid in said accumulator is limited to receive hydraulic fluid during said anti-lock braking event and to supply a pump with hydraulic fluid during said traction control event.

10. The vehicle braking system of claim 9, wherein the vehicle includes a differentially driven pair of wheels, and the electronic control unit monitors the wheel speed sensors associated with the driven wheels to respond to an excessive wheel speed of one driven wheel to energize the pump supplying brake fluid from the accumulator to the brake cylinder of said one wheel, and to enable the solenoid of the first normally open valve associated with the other driven wheel closing the first normally open valve preventing the pump from supplying braking fluid to the brake cylinder of the other driven wheel.

11. The vehicle braking system of claim 10, wherein said first path associated with a driven wheel includes a second normally open solenoid actuable valve normally providing a brake fluid path from the master cylinder to the first normally open valve, the electronic control further responding to an excessive wheel speed of said one driven wheel to energize the solenoid of the second normally open valve closing the valve to prevent the pump from supplying braking fluid from the master cylinder to the brake cylinder associated with said one wheel.

12. The vehicle braking system of claim 11, wherein there are two pumps powered by a common electric motor, one pump associated with each path associated with a driven wheel, each driven wheel path further including a second normally closed solenoid actuable valve, each second normally closed valve operable to provide a brake fluid flow path from a master cylinder to a corresponding pump inlet.

13. The vehicle braking system of claim 9, herein there are two accumulators, one associated with each driven wheel path and each first normally closed solenoid actuable valve is selectively opened during normal braking to replenish brake fluid in a corresponding accumulator.

14. The vehicle braking system of claim 9 wherein brake fluid from said accumulator supplied to said pump reduces the time required to achieved a traction control event.

* * * * *